(12) United States Patent
Shats et al.

(10) Patent No.: US 6,490,651 B1
(45) Date of Patent: Dec. 3, 2002

(54) HOST-BASED VIRTUAL DISK DRIVE FOR IMPROVING THE PERFORMANCE OF A HARD DISK DRIVE'S INPUT/OUTPUT

(75) Inventors: Serge Shats, Palo Alto; Claude Camp, Pleasanton; Maurice Schlumberger, Menlo Park; Iouri Bagachev, Sunnyvale, all of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/525,727

(22) Filed: Mar. 14, 2000

(51) Int. Cl.[7] .............................................. G06F 12/00
(52) U.S. Cl. ........................ 711/112; 711/113; 711/114; 710/8; 369/48
(58) Field of Search ...................... 711/112–114; 710/8; 369/48

(56) References Cited

U.S. PATENT DOCUMENTS

| | | | |
|---|---|---|---|
| 5,729,718 A | 3/1998 | Au | ........................... 395/494 |
| 5,761,166 A | * 6/1998 | Sedlmayr et al. | .............. 369/48 |
| 6,209,058 B1 | 3/2001 | Shats et al. | .................. 711/113 |
| 6,212,664 B1 | * 4/2001 | Feygin et al. | ............... 714/796 |
| 6,249,824 B1 | * 6/2001 | Henrichs | ........................ 710/8 |

* cited by examiner

Primary Examiner—Do Hyun Yoo
Assistant Examiner—Mehdi Namazi
(74) Attorney, Agent, or Firm—Anthony L. Miele; Palmer & Dodge, LLP

(57) ABSTRACT

Software executing in a hard disk drive's host computer system increases the perceived efficiency and performance of the hard disk drive. The host computer system implements a "virtual disk" that models physical parameters associated with the actual hard disk drive, such as seek time and physical location of the read/write heads. These parameters are used to implement host based disk drive optimization techniques such as command reordering and read-on-arrival commands.

34 Claims, 7 Drawing Sheets

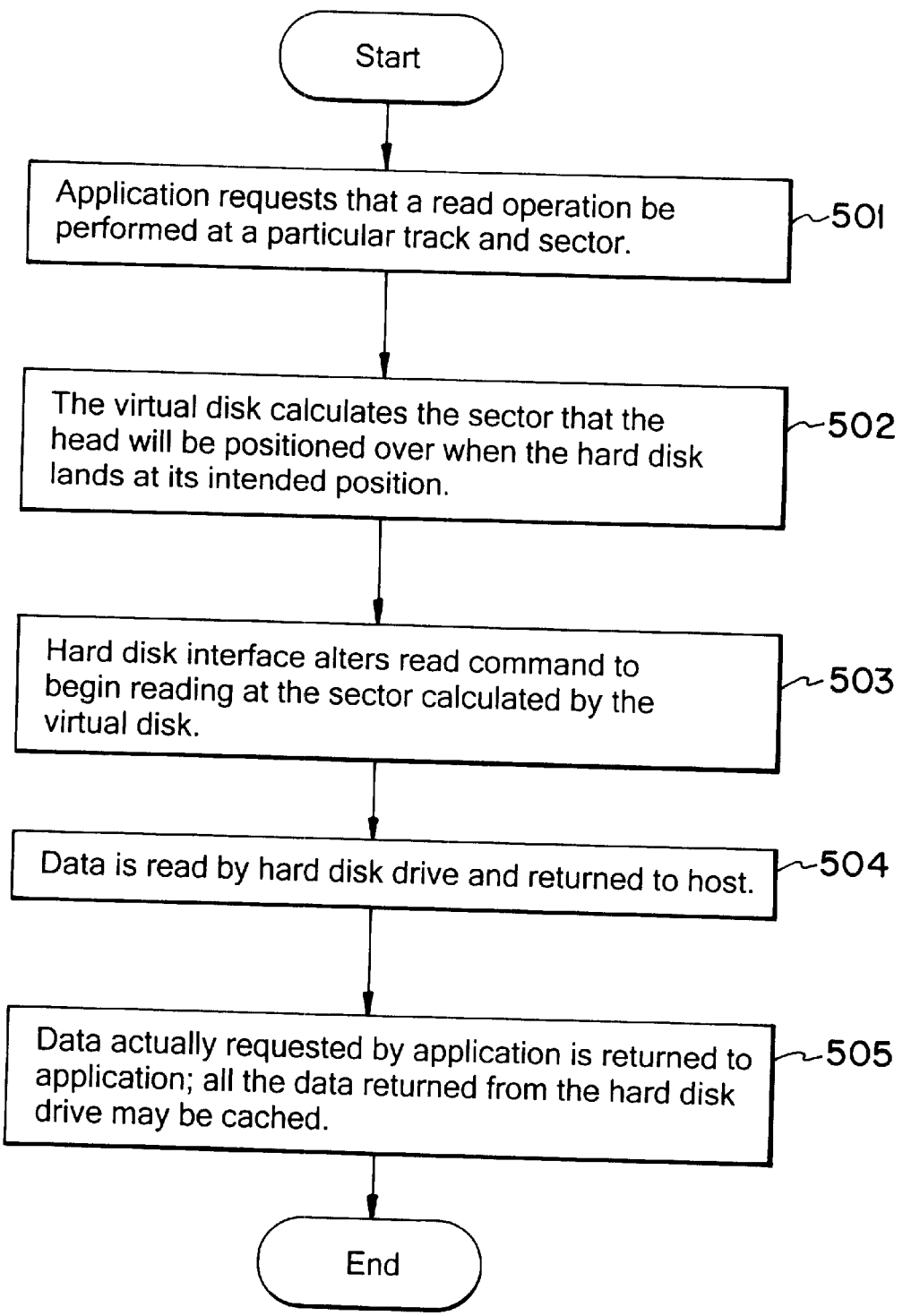

HOST-BASED VIRTUAL DISK DRIVE FOR IMPROVING THE PERFORMANCE OF A HARD DISK DRIVE'S INPUT/OUTPUT

RESERVATION OF COPYRIGHT

This patent document contains material subject to copyright protection. The copyright owner has no objection to the facsimile reproduction by anyone of the patent document, as it appears in the U.S. Patent and Trademark Office patent files or records, but otherwise reserves all copyright rights whatsoever.

BACKGROUND OF THE INVENTION

1. Field of the Invention

The present invention relates generally to hard disk drives, and more particularly, to techniques for improving hard disk drive performance.

2. Description of Background Information

Hard disk drives store information as magnetization patterns on magnetic media and are common components in today's personal computers. Typically, hard disk drives are the primary non-volatile storage location for both user data and software program data.

FIG. 1 is a diagram illustrating a conventional host computer system and its hard drive. Host computer system 12 includes fast access solid state memory 16, computer system bus 20, and CPU 18. Memory 16 is a solid-state semiconductor memory such as a dynamic random access memory (DRAM) that stores the data being manipulated by CPU 18. For example, memory 16 may store application code 32, operating system code 24, or user data 25. CPU 18 and memory 16 communicate with one another over bus 20.

Host computer 12 may read or write data from/to DRAM 16 to disk drive 10. Read or write commands from host computer 12 are received and interpreted by controller 26. Controller 26 controls spindle and actuator drivers 28 to read or write data to one or more magnetic platters in hard disk array (HDA) 30.

To increase performance, disk drive 10 may include a solid-state memory cache 32. In operation, data read from HDA 30, as well as being transferred to host system 12, is also placed in cache 32. If a subsequent disk read from computer system 12 requests data stored in cache 32, controller 26 retrieves the data from the faster cache memory 32 instead of the slower HDA 30. Because cache memory 32 is comprised of high-speed memory, when data requested by host system 12 is present in cache memory 32 (i.e., a "cache hit"), controller 26 is able to quickly access and return the requested data. Thus, cache memory 32 improves the overall performance of the disk drive.

Cache memory 32 is significantly more expensive per storage bit than data stored on the magnetic platters of HDA 30. The issue of cost therefore tends to limit the size of on-disk cache 32. Thus, there is a need in the art to increase disk drive performance without unduly increasing the cost of the disk drive.

SUMMARY OF THE INVENTION

An object of the present invention is to increase the performance of a hard disk drive without increasing the cost of the disk drive.

One aspect of the present invention is a computer system comprising a plurality of components. In particular, the computer system includes a hard disk drive, a random access memory, a virtual disk, and a processor. The random access memory stores operating system data and user data. The virtual disk models physical parameters of the hard disk drive. The processor optimizes data requests to the hard disk drive based on the physical parameters modeled by the virtual disk.

A second aspect of the present invention is a method for optimizing the perceived performance of a hard disk drive. The method comprises modeling physical parameters of the hard disk drive at a location external to the hard disk drive and optimizing data requests to the hard disk drive based on the modeled physical parameters.

A third aspect of the present invention is a computer readable medium containing computer instructions executable by a computer, the computer being coupled to a hard disk drive. The computer instructions, when executed by the computer, perform the steps of modeling physical parameters of the hard disk drive at a location external to the hard disk drive and optimizing data requests to the hard disk drive based on the modeled physical parameters.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein:

FIG. 5 is a flow chart illustrating a method through which a virtual disk increases the performance of cache by effectively converting read commands generated at host computer to read-on-arrival commands;

DETAILED DESCRIPTION OF AN THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts.

As generally described herein, software executing in a host computer system increases the perceived efficiency and performance of a hard disk drive. More particularly, the host computer system implements a "virtual disk" that models physical parameters associated with the actual hard disk drive, such as seek time and the physical location of the read/write heads. The physical parameters are used, for example, to implement read-on-arrival and command reordering techniques.

Figure 1:
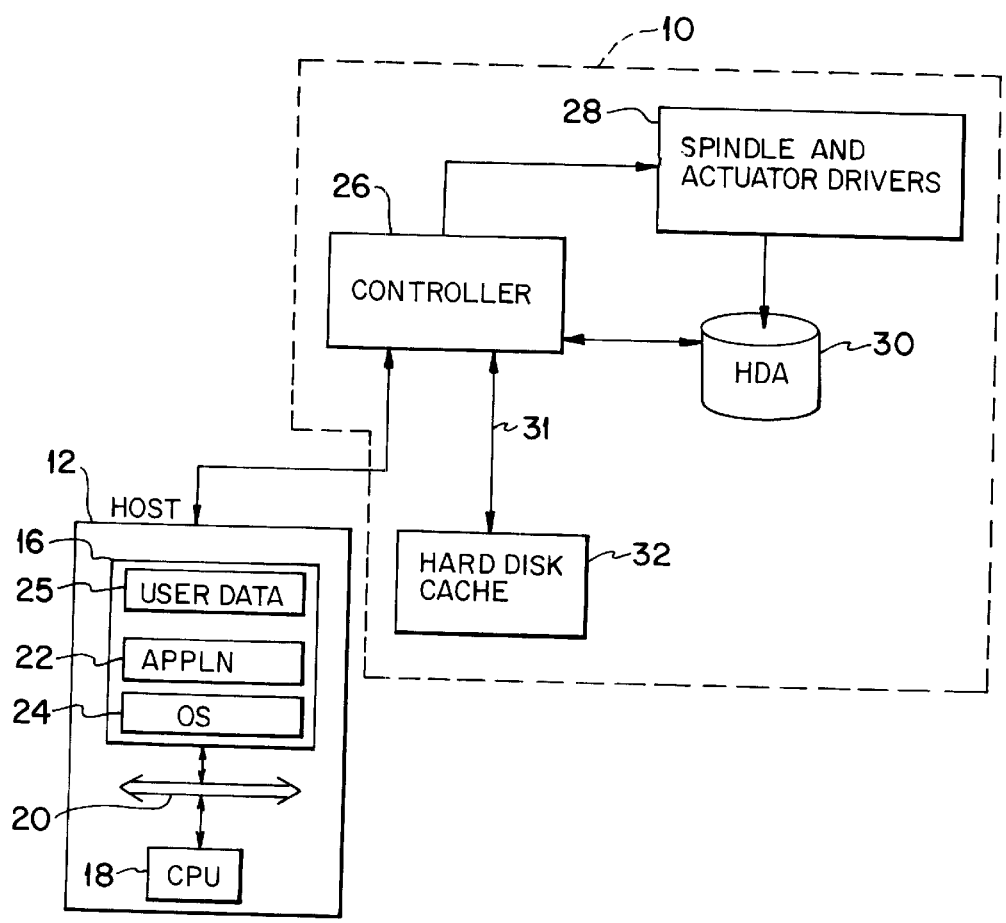
FIG. 1 is a block diagram of a computer system including a host computer and a hard disk.
Figure 2:
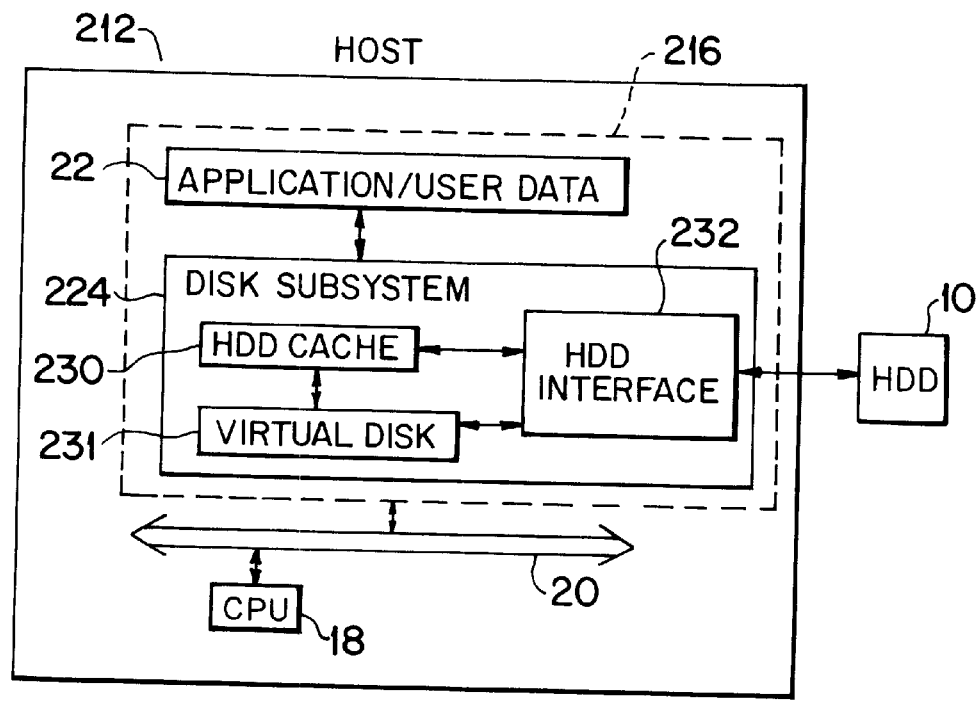
FIG. 2 is a block diagram illustrating hardware and software components of a computer system consistent with the present invention.

FIG. 2 is a block diagram illustrating hardware and software components of a computer system consistent with the present invention. Host computer 212 is similar to computer 12, shown in FIG. 1, except that host computer 212 additionally includes a hard disk drive cache 230 and a virtual disk 231 in communication with one another.

As shown, computer 212 contains a CPU 18, a bus 20, and a solid-state memory 216, which may be, for example, a dynamic random access memory (DRAM). Memory 216 contains a disk subsystem 224 and application or user data 22. Disk subsystem 224, which may be implemented as part of the operating system or separate from the operating system, includes computer instructions implementing a hard disk drive cache 230 and instructions implementing the virtual disk 231. Additionally, disk subsystem 244 includes hard disk drive interface 232, which communicates with hard disk drive 10.

Host computer system 212 stores or reads data to/from the attached hard disk drive 10. Disk drive 10 may include its own on-board cache, such as cache 32 (shown in FIG. 1) implemented along with hard disk drive cache 230. Disk drive 10 may be designed to coordinate its actions with virtual disk 231 and hard disk drive cache 230, or alternatively, virtual disk 231 and hard disk drive cache 230 may function transparently to disk drive 10.

Hard disk drive cache 230 functions in a manner similar to cache 32, a main difference being that cache 230 is implemented in main memory 216 of host computer 212. When host computer 212 requests data from hard disk 10 that is stored in cache 230, a cache hit occurs, and cache 230 supplies the requested data without having to physically access hard disk drive 10. Cache 230 may be much larger than cache 32; for example, cache 230 may be eight megabytes while cache 32 is only 512 kilobytes. Cache 230, by reducing the number of disk accesses, can significantly increase the perceived performance of a system's hard disk drive while increasing the life span of the disk drive.

The general design of cache memories are well known in the art. An explanation of the operation of a hard disk drive cache implemented in the host computer's main memory can be found in application Ser. No. 09/239,038, filed Jan. 27, 1999, now U.S. Pat. No. 6,209,058 B1, by the present assignee. The contents of this application are hereby incorporated by reference.

Hard disk drive cache 230, as described above, may be used to increase the performance of a hard disk drive without increasing the cost of the hard disk drive. Virtual disk 231, as will be described in more detail below, can be used to enhance the performance of cache 230 and/or hard disk drive interface 232.

Before describing the benefits derived by the virtual disk, it will be helpful to review the physical geometry of a hard disk drive.

Figure 3:
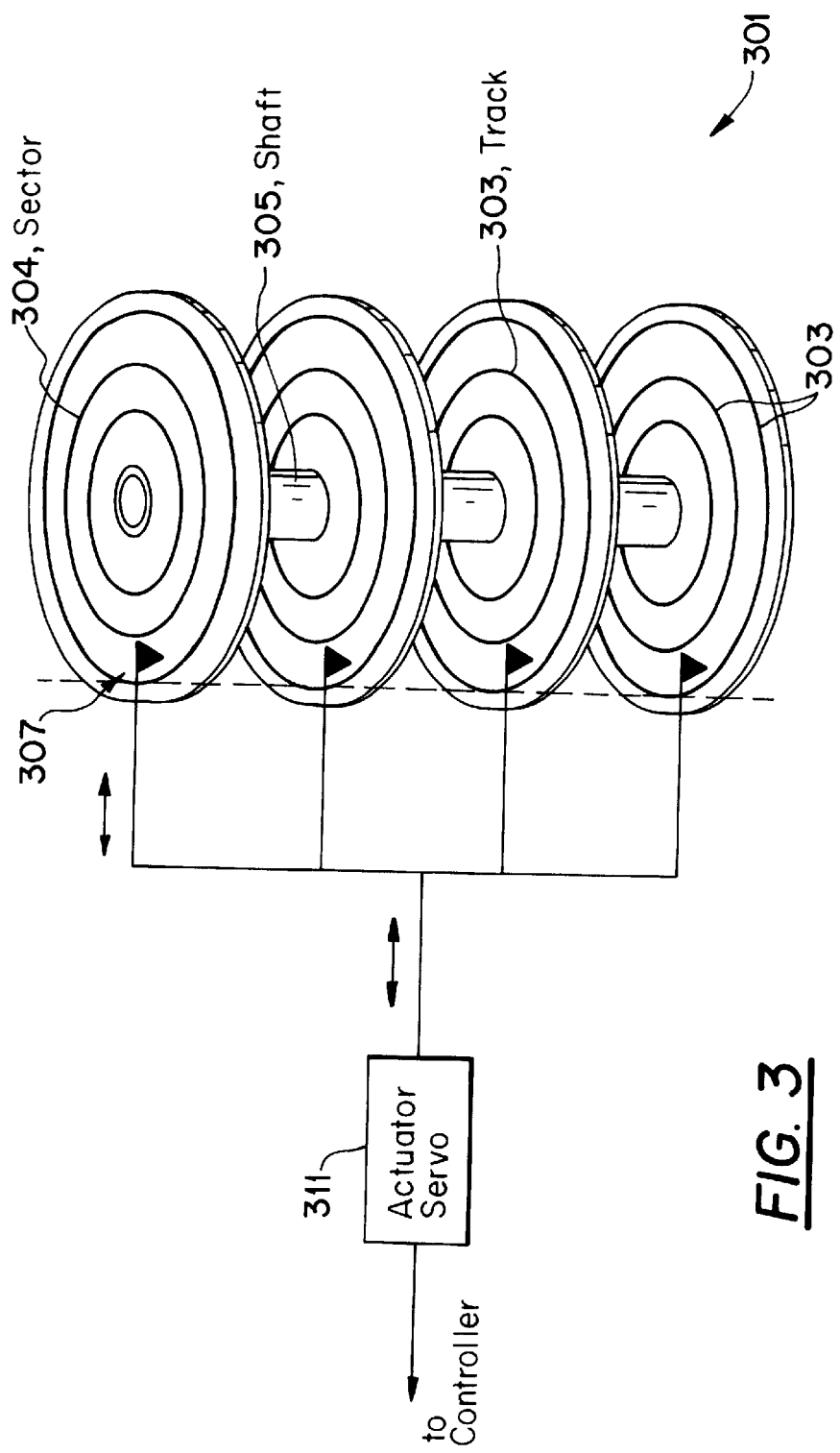
FIG. 3 is a diagram illustrating the arrangement of magnetic platters in a hard disk drive.

FIG. 3 is a diagram illustrating the arrangement of magnetic platters in a hard disk drive. Data in the disk drive is stored on the surface of one or more magnetic platters 301 in concentric tracks 303. Tracks 303 are further divided into sectors 304. In operation, when the disk drive is active, shaft 305, and hence platters 301, are constantly rotated by a motor (not shown). Heads 307, which read and write data to platters 301 by inducing magnetic fields incident on the platters, are positioned just above the platters (e.g., three micro-inches above the platters). Heads 307 move to the various tracks 303 on platters 301 by actuator servo 311.

Generally, the physical position of platters 301 relative to heads 307 are not known by host computer 12. For example, when host computer 12 wishes to read data from disk drive 10, it transmits a "logical block address" (LBA) to disk drive 10. The LBA specifies the specific sectors on platters 301 that the host computer 212 would like to read. In response, host computer 212 moves heads 307 to the appropriate position above platters 301, accesses the disk drive, and returns the requested data. Throughout this read operation, host computer 212 has no need to know, and indeed, disk drive 10 may not have been designed to inform the host computer, of the physical position of heads 307 at any particular instant.

One function of virtual disk 232 is to model the physical position of heads 307. Consistent with the present invention, this information may be used to increase the performance of the hard disk drive cache 230 by enabling cache 230 to convert read commands to "read-on-arrival" operations.

Figure 4:
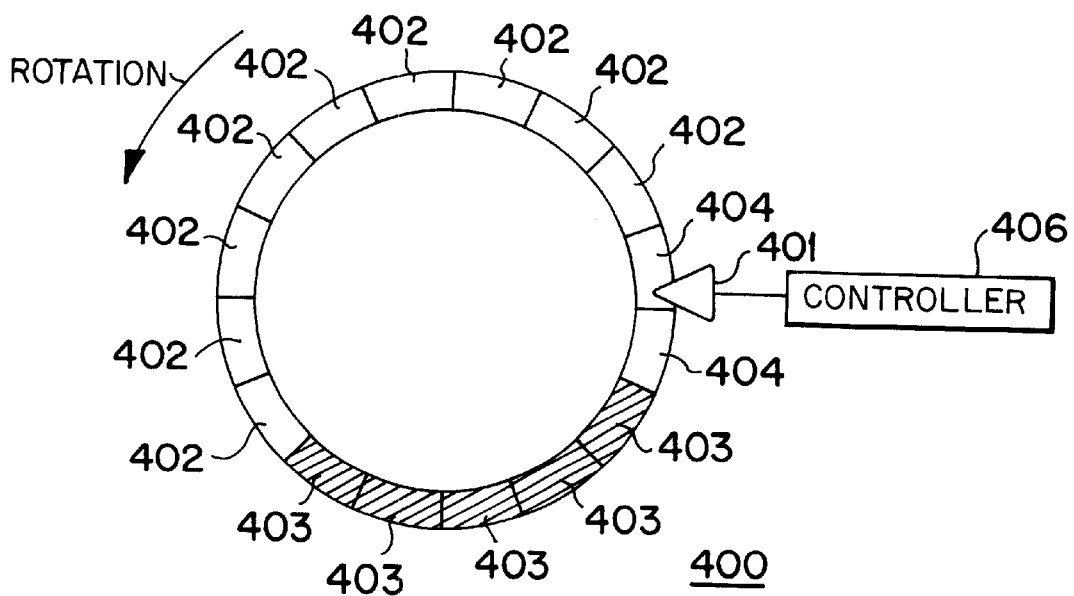
FIG. 4 is a diagram illustrating a read-on-arrival command.

FIG. 4 is a diagram illustrating the read-on-arrival command. Read-on-arrival commands are conventionally used in hard disk drives to increase the performance of the hard disk drive. A conceptual illustration of a disk drive track 400, divided into multiple sectors, is shown in FIG. 4. Head 401 reads data from sectors 402, 403, and 404. Assume that a conventional read command (not a read-on-arrival command) is implemented by controller 406 to read sectors 403 (shaded). Conventionally, controller 406 would wait until the first of sectors 403 rotated under head 401, at which time the controller instructs head 401 to begin reading the requested data. In contrast, with a read-on-arrival operation, head 401 begins reading data as soon as it is positioned over track 400. Data in sectors 404, the sectors between the arrival of head 401 and the beginning of the requested data, are simply cached in the cache within the disk drive. Because read commands dispatched by host computer systems are often request data from a related area or "hot-spot" on the disk drive, there is a high probability that data from sectors 404 will soon be requested by the host computer. In which case the data can be read from the disk's on-board cache instead of platter 400.

FIG. 5 is a flow chart illustrating a method through which virtual disk 232 increases the performance of cache 230 by effectively converting read commands generated at host computer 212 to read-on-arrival commands. The method begins after a request that data be read from hard disk drive 10, such as a request from an application in memory 22 (act 501). Virtual disk 231 calculates the sector that the hard disk drive head will be positioned over when the hard disk drive begins reading the data requested by the application (act 502). With this information, the hard disk drive interface 232 alters the read command so that the read command requests data from the hard disk drive beginning at the calculated sector (act 503). The hard disk drive thus reads and returns both the data actually requested by the application and any additional data stored in the sectors between the landing position of the hard disk drive head and the start of the requested data (act 504). Finally, disk subsystem 224 returns only the requested data to the application, although it may cache all the data in hard disk drive cache 230 (act 505).

By helping to convert, at the host level, read operations to read-on-arrival operations, virtual disk 231 enhances the effectiveness of the hard disk drive cache 230, and thus the perceived performance of the hard disk drive.

A second method through which the virtual disk 231 enhances the perceived performance of the hard disk drive is by implementing "command reordering" at the host level. In the absence of command reordering techniques, hard disk drive 10 executes commands in the order in which it receives them. The result is that the disk drive heads tend to randomly and inefficiently sweep over the surface of the hard disk platters. Command reordering techniques attempt to reorder the sequence of drive commands to minimize the random movement of the read/write head.

Consistent with an aspect of the present invention, physical parameters of the disk drive predicted by virtual disk 231 are used to implement a command reordering scheme in the host computer 212. In particular, disk subsystem 224 uses predictions of disk drive head position and seek time (the time for the hard disk drive head to get to a specific track) to implement command reordering.

Disk subsystem 224 may use the ORCA™ (Optimized Reordering Command Algorithm) command ordering technique. The ORCA technique is described in more detail in U.S. Pat. No. 5,729,718, the contents of which are hereby incorporated by reference. Alternatively, disk subsystem 224 may use other command reordering techniques, which are well known in the art, such as one of the so-called "shortest seek time-first ordering" or "elevator seeking" methods.

A more detailed illustrative implementation of virtual disk 231 will now be described.

The output values modeled by virtual disk 231, such as the hard disk seek time and the position of the drive heads, are based on a number of more basic disk specific and host computer specific parameters. A summary of these disk specific parameters, grouped into related categories, is shown in Table I.

The disk specific parameters may be stored in disk drive 10 and uploaded into virtual disk 231 at the request of the virtual disk. In this manner, virtual disk 231 may periodically query hard disk drive 10, ensuring that a current version of the specific disk drive parameters are being used. If disk drive 10 is not designed to respond to the query of virtual disk 231, the disk specific parameters may be "hard-wired" into the computer code that comprises virtual disk 231.

Not all of the parameters shown in Table I relate only to disk drive 10. For example, the parameters relating to software overhead are dependent on the specific configuration of host computer 212, and are measured by virtual disk drive 231.

TABLE I

Disk and Host Specific Parameters Used By Virtual Disk 231

| Parameter | Description |
| --- | --- |
| seek profile | Time required for the disk heads to move from one particular track to another. |
| physical zone table | Description of the physical configuration of the drive, such as the number of cylinders and the number of sectors per track. |
| inline defects and spare sectors | Inline defects are the known defective sectors. Spare sectors are reserve sectors that are used to take the place of defective sectors. This information is needed to convert logical block addresses (LBAs) to physical block addresses (PBAs). |
| read-to-write and write-to-read switch time | Times required for the disk drive head to switch between performing a read operation to performing a write operation or from performing a write operation to performing a read operation. |
| software and firmware overheads | Delays associated with software execution in host computer 212 or hard disk drive 10. |

In general, virtual disk drive 231 predicts output parameters such as hard disk seek time and drive head position for a particular disk operation based on the type of operation being performed (i.e., read or write), the starting LBA (logical block address) of the read or write operation, and the ending LBA of the read or write operation.

Figure 6:
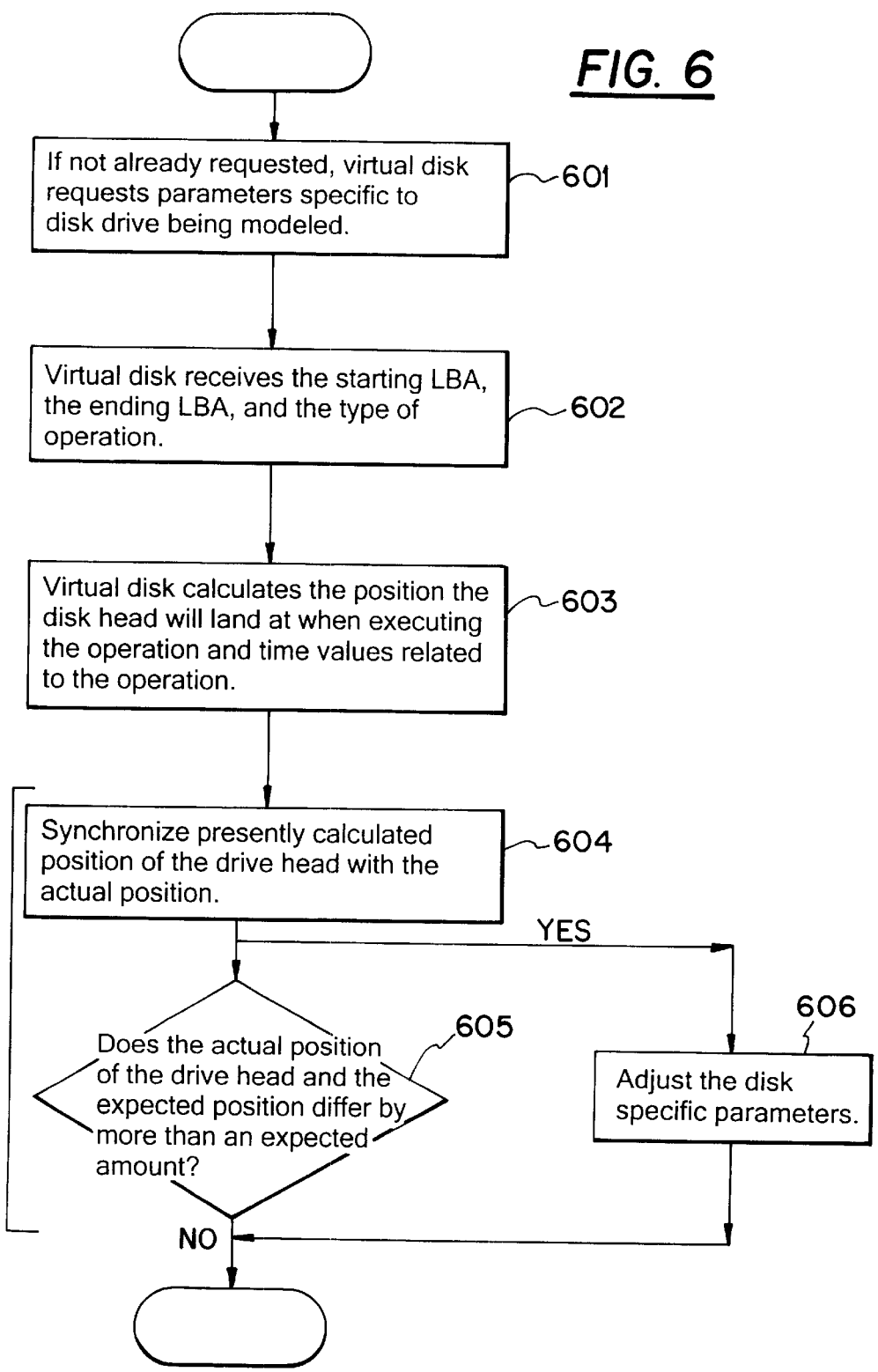
FIG. 6 is a flow chart illustrating methods performed by the virtual drive.

FIG. 6 is a flow chart illustrating the main methods performed by virtual drive 231. As described above, before modeling a particular hard disk drive 10, the virtual disk first requests the basic parameters specific to the disk drive being modeled. (Act 601). The starting LBA, ending LBA, and the type of disk operation may then be used by virtual disk 231, (act 602), to calculate the desired disk parameter, such as the position the disk drive head will land at when executing the operation or the time for the head to reach the landing position (seek time). (Act 603). Other related information, such as the time required for the head to rotate from the landing position to the end of the data transfer, may also be calculated.

Virtual disk 231 periodically synchronizes the position of the virtual disk drive head with the actual position of the disk drive head. (Act 604). If the actual position of the head and the calculated position of the head differ by more than an expected amount of variance, this may signal that the parameters specific to the disk drive (i.e., those shown in Table I), are not accurate. (Act 605). In this case, the virtual disk may adjust or re-request these parameters from hard disk drive 10. (Act 606).

Synchronization of the virtual disk head position with the actual position of the disk drive head, as performed in Act 603, is periodically performed by the virtual disk. Typically, hard disk drives do not include a "synchronize" command that gives the position of the hard disk head at any arbitrary point in time. Instead, host system 212 is only able to discern the exact position of the drive heads at certain times. For example, after completion of each read command that accesses magnetic media, the position of the hard disk head is the position of the last sector of data read. Virtual disk 231 may also know the actual position of the disk drive head at the point when the disk drive finishes executing a number of write commands and is switching to a read command. In this situation, the disk drive may issue an "internal flush" command (a common disk drive command) between the last write command and the read command. The internal flush command instructs the disk drive to finish all pending write operations before proceeding. After the internal flush, the hard disk head is at the last sector of the last write command.

Figure 7A:
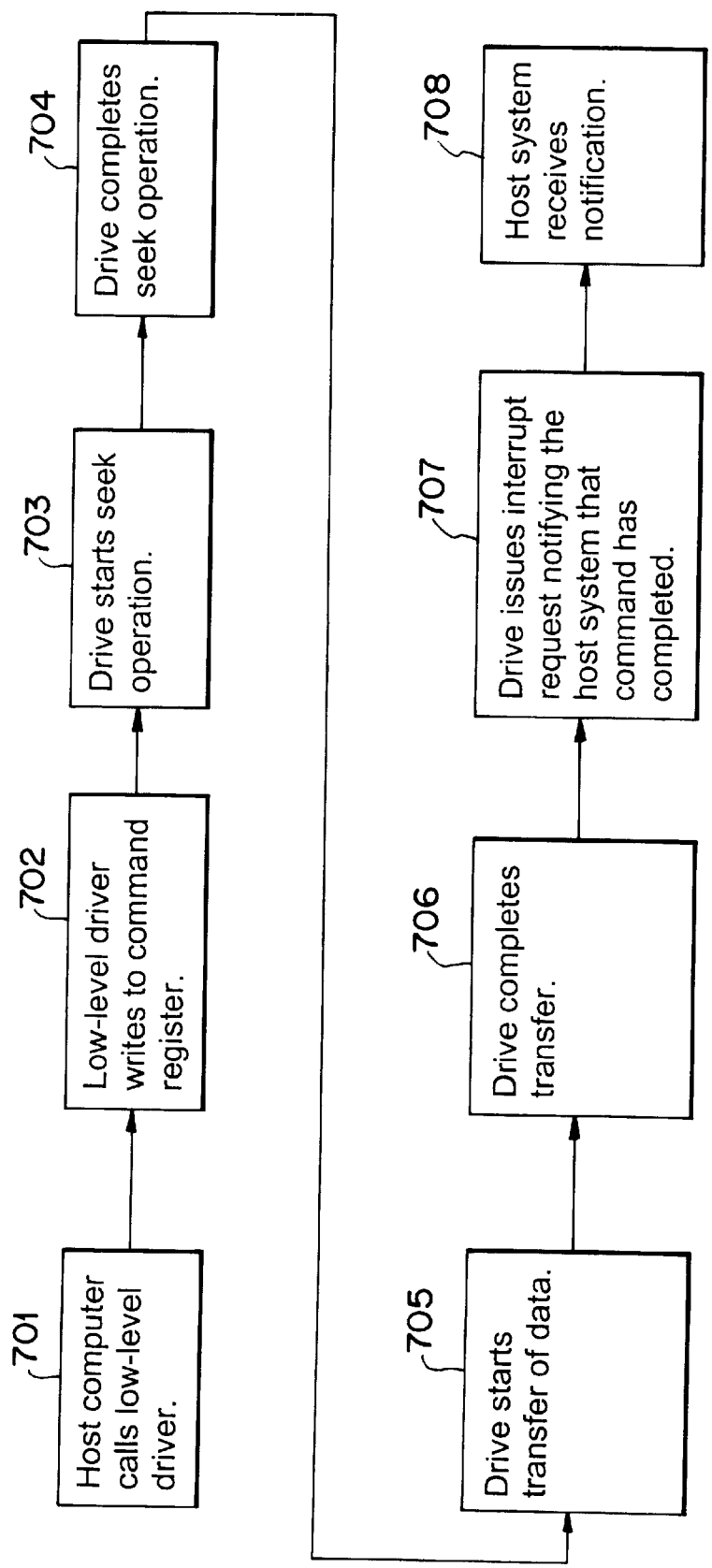
FIGS. 7A and 7B are diagrams illustrating calculating position and timing information for a disk drive head.
Figure 7B:
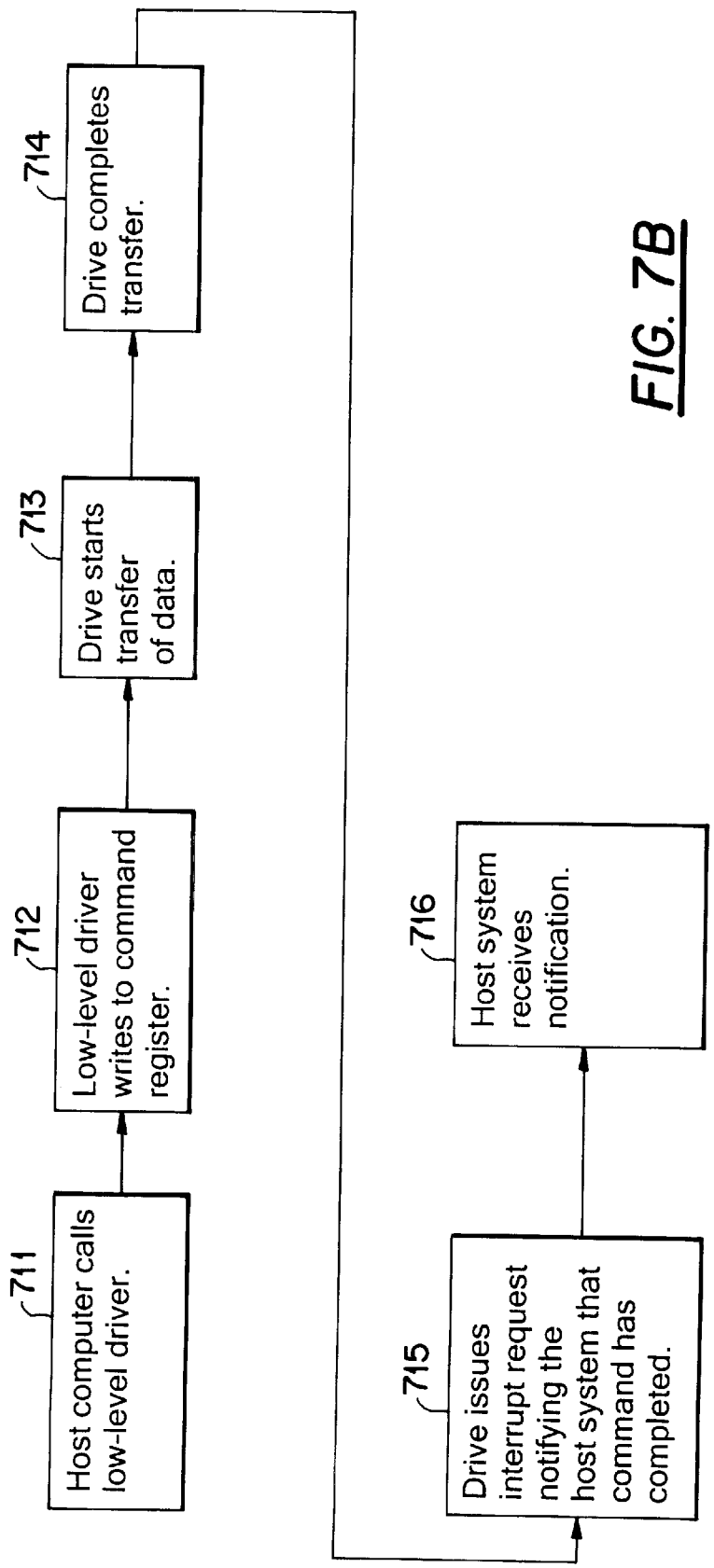

FIGS. 7A and 7B are diagrams illustrating how virtual disk 231 calculates, for a particular disk operation, the desired positional and timing information of the disk drive head.

FIG. 7A shows a "time lime" having points corresponding to sequential events occurring in a read or write operation in which the disk drive heads must perform a seek across a disk drive track. Eight events, labeled 701–708, are shown. The events are: host computer system calls low level driver (701), lowest level driver writes to a command register of the host computer system (702), disk drive starts seek operation (703), disk drive completes seek operation (704), drive starts transfer of data (705), drive completes transfer of data (706), drive issues interrupt request notifying the host system that command has completed (707), and the host system receives notification that the command has completed (708). The time required for the hard disk drive to complete the entire operation is simply the sum of the individual time periods between points 701–702, 702–703, . . . , 707–708. These individual time periods are based on the prior state of the drive, the operation being performed, and the drive specific parameters.

The time line of FIG. 7B is similar to that of FIG. 7A, except that where FIG. 7A represents a seek across a disk track, FIG. 7B represents the sequential events occurring for an operation at the same track as the previous operation but which requires a different one of the hard disk heads. The eight events of FIG. 7A are reduced to six in FIG. 7B, labeled 711, 712, 713, 714, 714, and 716. The events are: host computer system calls low level driver (711), lowest level driver writes to a command register of the host computer system (712), drive starts transfer of data (713), drive completes transfer of data (714), drive issues interrupt request notifying the host system that command has completed (715), and the host system receives notification that the command has completed (716). As with FIG. 7A, the time required for the hard disk drive to complete the entire operation is simply the sum of the individual time periods between points 711–712, 712–713, . . . ,715–716.

In addition to the series of events shown in FIGS. 7A and 7B, a third situation arises when a period of non-activity passes between the last command and the current command. In this situation, virtual disk 231 estimates the position based on the elapsed time and the rotations per minute (RPM) of the disk drive. At this point, the time lines of FIGS. 7A or 7B are employed to complete the prediction of the head landing and timing information.

As generally described above, a virtual disk drive is implemented in a host computer. Based on disk drive commands generated at the host computer, the virtual disk tracks the present state and predicts future states of the hard disk drive. More specifically, the virtual disk models information relating to the position and timing of the hard disk drive heads. The modeled information is used to increase the perceived performance of the hard disk drive.

While the invention has been described by way of an exemplary embodiment, it is understood that the words used herein are words of description, rather than words of limitation. Changes may be made, within the purview of the appended claims, without departing from the scope and the spirit of the invention in its broader aspects. Although the invention has been described herein with reference to particular structure, materials, methods, and embodiments, it is understood that the invention is not limited to the particulars disclosed. The invention extends to all equivalent structures, mechanisms, and uses.

What is claimed is:

1. A computer system comprising:
   a hard disk drive;
   a random access memory, the random access memory storing operating system data and user data;
   a virtual disk implemented in the random access memory, the virtual disk modeling physical parameters of the hard disk drive; and
   a processor coupled to the random access memory and the hard disk drive, the processor executing instructions from the random access memory and optimizing data requests to the hard disk drive based on the physical parameters modeled by the virtual disk.

2. The computer system of claim 1, wherein the virtual disk models a hard disk drive seek time.

3. The computer system of claim 1, wherein the virtual disk models a head position of the hard disk drive.

4. The computer system of claim 1, wherein the processor optimizes data requests to the hard disk drive by performing command reordering.

5. The computer system of claim 1, wherein the random access memory further includes a hard disk drive cache.

6. The computer system of claim 5, wherein the processor optimizes data requests to the hard disk drive by converting read commands to read-on-arrival commands.

7. The computer system of claim 1, wherein the virtual disk is implemented as a part of the operating system.

8. A method for optimizing perceived performance of a hard disk drive, the method comprising: forming a virtual disk in a host computer including modeling physical parameters of the hard disk drive at a location in a random access memory external to the hard disk drive; and
   optimizing data requests from the random access memory to the hard disk drive base on the modeled physical parameters of the virtual disk.

9. The method of claim 8, wherein the modeling of physical parameters includes modeling hard disk drive seek time.

10. The method of claim 8, wherein the modeling of physical parameters includes modeling head position of the hard disk drive.

11. The method of claim 8, wherein the optimization of data requests to the hard disk drive is implemented by command reordering.

12. The method of claim 8, wherein the optimization of data requests to the hard disk drive is implemented by converting read commands to read-on-arrival commands.

13. A machine readable medium, the machine readable medium when read by a machine performing:
   forming in a random access memory external to a hard disk drive a representation of a virtual disk comprising modeling physical parameters of the hard disk drive; and
   optimizing data requests from the random access memory to the hard disk drive base on the modeled physical parameters of the virtual disk.

14. The machine readable medium of claim 13, wherein the modeling of physical parameters includes modeling hard disk drive seek time.

15. The machine readable medium of claim 13, wherein the modeling of physical parameters includes modeling head positions of the hard disk drive.

16. The machine readable medium of claim 13, wherein the optimizing of data requests to the hard disk drive is implemented by command reordering.

17. The machine readable medium of claim 13, wherein the optimizing of data requests to the hard disk drive is implemented by converting read commands to read-on-arrival commands.

18. The computer system of claim 1, wherein the physical parameters are modeled using at least one of time seek profile, physical zone table, inline defects and spare sectors, read-to-write and write-to-read switch time, and software and firmware overheads.

19. The computer system of claim 1, wherein the physical parameters are modeled using a starting and an ending logical block address.

20. The computer system of claim 1, wherein the processor optimizes data requests to the hard disk drive using an optimized reordering command algorithm.

21. The method of claim 8, wherein modeling physical parameters comprises using parameters including at least one of time seek profile, physical zone table, inline defects and spare sectors, read-to-write and write-to-read switch time, and software and firmware overheads.

22. The method of claim 8, wherein modeling physical parameters comprises using parameters including a starting logical block address and an ending logical block address.

23. The method of claim 8, wherein modeling physical parameters comprises synchronizing a calculated position of the drive head with an actual position of the drive head.

24. The method of claim 8, wherein modeling physical parameters comprises implementing an optimized reordering command algorithm.

25. The method of claim 8, wherein modeling physical parameters comprises performing a command reordering using a shortest seek time-first ordering method.

26. The method of claim 8, wherein modeling physical parameters comprises performing a command reordering using an elevator seeking method.

27. The method of claim 8, wherein optimizing of data requests to the hard disk drive is implemented by converting read commands to read-on-arrival commands including:

calculating a sector that a hard disk drive head will be positioned over when the hard disk drive lands at its intended landing position to read data requested by an application;

altering read commands by a hard disk drive interface to begin reading at said secotor;

reading data by the hard disk drive;

returning both data requested by the application and data stored in sectors between the landing position of the hard disk drive and the start of the data request; and returning only requested data to the application.

28. The machine readable medium of claim 13, wherein modeling physical parameters comprises using parameters including at least one of time seek profile, physical zone table, inline defects and spare sectors, read-to-write and write-to-read switch time, and software and firmware overheads.

29. The machine readable medium of claim 13, wherein modeling physical parameters comprises using parameters including a starting logical block address and an ending logical block address.

30. The machine readable medium of claim 13, wherein modeling physical parameters comprises synchronizing a calculated position of the drive head with an actual position of the drive head.

31. The machine readable medium of claim 13, wherein modeling physical parameters comprises implementing an optimized reordering command algorithm.

32. The machine readable medium of claim 13, wherein modeling physical parameters comprises performing a command reordering using a shortest seek time-first ordering method.

33. The machine readable medium of claim 13, wherein modeling physical parameters comprises performing a command reordering using an elevator seeking method.

34. The machine readable medium of claim 13, wherein optimizing of data requests to the hard disk drive is implemented by converting read commands to read-on-arrival commands including:

calculating a sector that a hard disk drive head will be positioned over when the hard disk drive lands at its intended landing position to read data requested by an application;

altering read commands by a hard disk drive interface to begin reading at said sector;

reading data by the hard disk drive;

returning both data requested by the application and data stored in sectors between the landing position of the hard disk drive and the start of the data request; and returning only requested data to the application.

* * * * *